(12) United States Patent
Pitteloud et al.

(10) Patent No.: US 8,703,335 B2
(45) Date of Patent: Apr. 22, 2014

(54) LITHIUM MIXED METAL OXIDE AND NONAQUEOUS ELECTROLYTE SECONDARY BATTERY

(75) Inventors: Cedric Pitteloud, Tsukuba (JP); Yuichiro Imanari, Tsukuba (JP); Kenji Nakane, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 854 days.

(21) Appl. No.: 12/679,800

(22) PCT Filed: Sep. 26, 2008

(86) PCT No.: PCT/JP2008/067983
§ 371 (c)(1),
(2), (4) Date: Jun. 9, 2010

(87) PCT Pub. No.: WO2009/041722
PCT Pub. Date: Apr. 2, 2009

(65) Prior Publication Data
US 2010/0248032 A1    Sep. 30, 2010

(30) Foreign Application Priority Data

Sep. 28, 2007 (JP) ................................. 2007-253866
Jun. 11, 2008 (JP) ................................. 2008-152623

(51) Int. Cl.
*H01M 4/13* (2010.01)

(52) U.S. Cl.
USPC ........................................................ 429/221

(58) Field of Classification Search
None
See application file for complete search history.

(56) References Cited

U.S. PATENT DOCUMENTS 5,686,203 A * 11/1997 Idota et al. ..................... 429/342
6,352,794 B1 * 3/2002 Nakanishi et al. ............. 429/221

(Continued)

FOREIGN PATENT DOCUMENTS

CN      1870330 A     11/2006
EP      1372202 A1    12/2003

(Continued)

OTHER PUBLICATIONS

Spahr et al., Characterization of Layered Lithium Nickel Manganese Oxides Synthesized by a Novel Oxidative Coprecipitation Method and their Electrochemical Performance as Lithium Insertion Electrode Material, J. Electrochem. Soc., vol. 145, No. 4, 1113-1120, Apr. 1998.*

(Continued)

*Primary Examiner* — Patrick Ryan
*Assistant Examiner* — Jose Colucci Rios
(74) *Attorney, Agent, or Firm* — Sughrue Mion, PLLC

(57) ABSTRACT

A lithium mixed metal oxide comprising Ni, Mn and Fe and having a BET specific surface area of 2 $m^2/g$ or more and 30 $m^2/g$ or less. A method of producing a lithium mixed metal oxide, comprising bringing an aqueous solution containing Ni, Mn, Fe and Cl into contact with an alkali to obtain a coprecipitate, and calcining a mixture of the coprecipitate and a lithium compound by maintaining the mixture at a temperature of lower than 900° C. A positive electrode active material for nonaqueous electrolyte secondary battery, comprising the lithium mixed metal oxide described above or the lithium mixed metal oxide obtained by the method of producing a lithium mixed metal oxide described above as a main ingredient. A positive electrode for nonaqueous electrolyte secondary battery having the positive electrode active material for nonaqueous electrolyte secondary battery described above.

9 Claims, 1 Drawing Sheet

(56) References Cited

U.S. PATENT DOCUMENTS

| | | | |
|---|---|---|---|
| 2002/0119374 A1* | 8/2002 | Yang et al. ................. | 429/231.1 |
| 2007/0092428 A1 | 4/2007 | Sotowa et al. | |
| 2009/0035659 A1 | 2/2009 | Takeuchi et al. | |

FOREIGN PATENT DOCUMENTS

| | | |
|---|---|---|
| JP | 2000-195516 A | 7/2000 |
| JP | 2005-085720 A | 3/2005 |
| JP | 2005-158718 A | 6/2005 |
| JP | 2005-194106 A | 7/2005 |
| JP | 2006-036621 A | 2/2006 |
| JP | 2006-120529 A | 5/2006 |
| JP | 2006-310181 A | 11/2006 |
| JP | 2007-091573 A | 4/2007 |
| WO | 02/073718 A1 | 9/2002 |

OTHER PUBLICATIONS

Meng et al., Combining Ab Initio Computation with Experiments for Designing New Electrode Materials for Advanced Lithium Batteries: $LiNi_{1/3}Fe_{1/6}Co_{1/6}Mn_{1/3}O_2$, Journal of the Electrochemical Society, 151, (8), A1134-A1140 (2004), Available electronically Jun. 17, 2004).*

Tabuchi et al., Optimizing Chemical Composition and Preparation Conditions for Fe-Substituted $Li_2MnO_3$ Positive Electrode Material, Journal of the Electrochemical Society, 154 (7) A638-A648 (2007), Available electronically May 10, 2007.*

Extended European Search Report dated Nov. 6, 2012 in European Application No. 08833942.9 to Sumitomo Chemical Co., Ltd.

Japanese Office Action issued in JP Application No. 2008-239223, dated Apr. 9, 2013.

Japanese Office Action issued in JP Application No. 2008-239223, dated Aug. 6, 2013.

Chinese Office Action issued in CN Application No. 200880117637.1, dated Jun. 5, 2012.

Chinese Office Action issued in CN Application No. 200880117637.1, dated Feb. 8, 2013.

Chinese Office Action issued in CN Application No. 200880117637.1, dated Sep. 23, 2013.

* cited by examiner

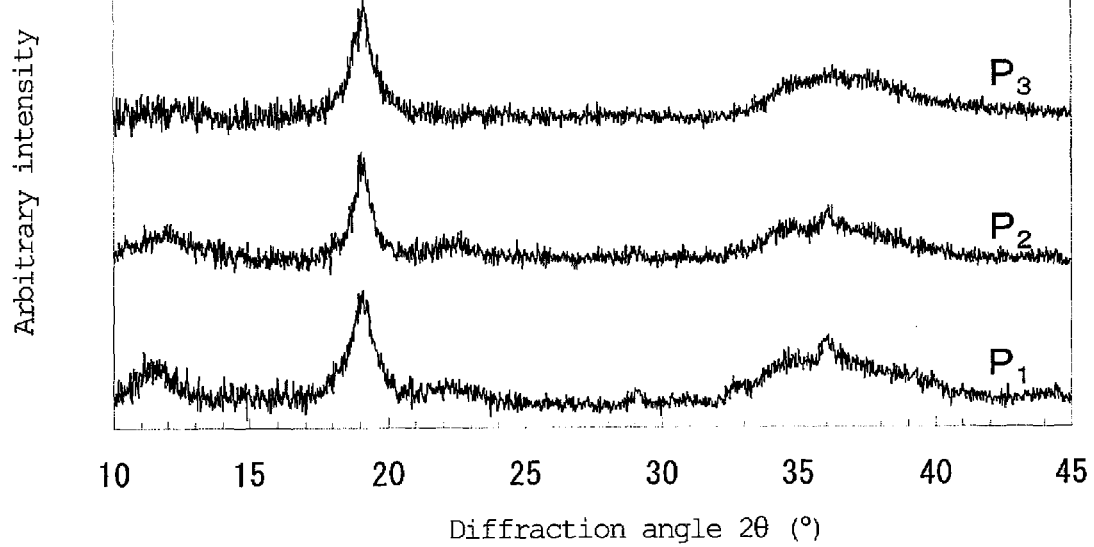

LITHIUM MIXED METAL OXIDE AND NONAQUEOUS ELECTROLYTE SECONDARY BATTERY

TECHNICAL FIELD

The present invention relates to a lithium mixed metal oxide and a nonaqueous electrolyte secondary battery. More particularly, the present invention relates to a lithium mixed metal oxide used for a positive electrode active material for nonaqueous electrolyte secondary battery, and to a nonaqueous electrolyte secondary battery.

BACKGROUND ART

A lithium mixed metal oxide is used as a positive electrode active material in a nonaqueous electrolyte secondary battery such as a lithium secondary battery. A lithium secondary battery has been previously put into practical use as an electric source of cell phones, laptop computers and the like, and further, there are trials of application thereof also in medium or large size applications such as an automobile application and an electric power storage application.

Regarding conventional lithium mixed metal oxides, International publication No. 02/073718 discloses a manganese-nickel-iron coprecipitate compound obtained by adding a sodium hydroxide aqueous solution to an aqueous solution containing manganese nitrate, nickel nitrate and iron sulfate, and a lithium mixed metal oxide obtained by calcining a mixture of the compound and a lithium compound at a temperature of 1000° C., and describes that the oxide has a BET specific surface area of 0.9 m²/g.

However, nonaqueous electrolyte secondary batteries obtained by using the conventional lithium mixed metal oxides, as described above, as a positive electrode active material are not sufficient in applications requiring high power output at high current rate, that is, in an automobile application and an application of power tools such as electrical tools.

DISCLOSURE OF THE INVENTION

The present invention has an object of providing a nonaqueous electrolyte secondary battery capable of manifesting high power output at high current rate, and a lithium mixed metal oxide useful for the battery, and a method of producing a lithium mixed metal oxide.

As a result of various investigations in view of the above-described situations, the present inventors have found that the following inventions meet the above-described object, leading to the present invention.

That is, the present invention provides the following inventions.

<1> A lithium mixed metal oxide comprising Ni, Mn and Fe and having a BET specific surface area of 2 m²/g or more and 30 m²/g or less.

<2> The lithium mixed metal oxide according to <1>, wherein the lithium mixed metal oxide is shown by the following formula (A):

$$\text{Li}(\text{Ni}_{1-x-y}\text{Mn}_x\text{Fe}_y)\text{O}_2 \qquad (A)$$

wherein, 0<x<1, 0<y<1, and 0<x+y<1.

<3> The lithium mixed metal oxide according to <1>, wherein the lithium mixed metal oxide is shown by the following formula (A'):

$$\text{Li}_z(\text{Ni}_{1-x-y}\text{Mn}_x\text{Fe}_y)\text{O}_2 \qquad (A')$$

wherein, 0<x<1, 0<y<1, 0<x+y<1, and 0.5≤z≤1.5.

<4> The lithium mixed metal oxide according to any one of <1> to <3>, wherein the ratio of the amount (mol) of Mn with respect to the total amount (mol) of Ni, Mn and Fe is 0.1 or more and 0.7 or less.

<5> The lithium mixed metal oxide according to any one of <1> to <4>, wherein the ratio of the amount (mol) of Fe with respect to the total amount (mol) of Ni, Mn and Fe is 0.01 or more and 0.5 or less.

<6> A method of producing a lithium mixed metal oxide, comprising bringing an aqueous solution containing Ni, Mn, Fe and Cl into contact with an alkali to obtain a coprecipitate, and calcining a mixture of the coprecipitate and a lithium compound by maintaining the mixture at a temperature of lower than 900° C.

<7> The method of producing a lithium mixed metal oxide according to <6>, comprising the following steps (1), (2) and (3) in that order:
(1) a step of bringing an aqueous solution containing Ni, Mn, Fe and Cl into contact with an alkali to obtain a coprecipitate slurry,
(2) a step of obtaining a coprecipitate from the coprecipitate slurry,
(3) a step of calcining a mixture obtained by mixing the coprecipitate and a lithium compound by maintaining the mixture at a temperature of lower than 900° C., to obtain a lithium mixed metal oxide.

<8> The method of producing a lithium mixed metal oxide according to <7>, wherein the above-described step (2) is the following step (2'):
(2') a step of subjecting the coprecipitate slurry to solid-liquid separation, then, to washing and drying, to obtain a coprecipitate.

<9> The method of producing a lithium mixed metal oxide according to any one of <6> to <8>, wherein the aqueous solution containing Ni, Mn, Fe and Cl is an aqueous solution obtained by dissolving a chloride of Ni, a chloride of Mn, and a chloride of Fe into water.

<10> The method of producing a lithium mixed metal oxide according to <9>, wherein the chloride of Fe is a chloride of divalent Fe.

<11> The method of producing a lithium mixed metal oxide according to any one of <6> to <10>, wherein the atmosphere in the calcination is an air atmosphere.

<12> The method of producing a lithium mixed metal oxide according to any one of <6> to <11>, wherein the retention temperature in the calcination is in the range of from 650° C. to 850° C.

<13> The method of producing a lithium mixed metal oxide according to any one of <6> to <12>, wherein in the aqueous solution containing Ni, Mn, Fe and Cl, the ratio of the amount (mol) of Mn with respect to the total amount (mol) of Ni, Mn and Fe is 0.1 or more and 0.7 or less.

<14> The method of producing a lithium mixed metal oxide according to any one of <6> to <13>, wherein in the aqueous solution containing Ni, Mn, Fe and Cl, the ratio of the amount (mol) of Fe with respect to the total amount (mol) of Ni, Mn and Fe is 0.01 or more and 0.5 or less.

<15> A lithium mixed metal oxide obtained by the method of producing a lithium mixed metal oxide according to any one of <6> to <14>.

<16> A coprecipitate obtained by bringing an aqueous solution containing Ni, Mn, Fe and Cl into contact with an alkali, wherein a diffraction peak (diffraction peak A) is present in the range of diffraction angle 2θ of 17° or more and 20° or less, in a powder X-ray diffraction pattern obtained by powder X-ray diffractometry using CuKα as a radiation source and in which the measurement range of diffraction angle 2θ is 10° or more and 45° or less.

<17> The coprecipitate according to <16>, wherein the value of peak intensity ratio ($I_B/I_A$) obtained by dividing $I_B$ by the intensity $I_A$ of the diffraction peak A is 0 or more and 0.5 or less, when the maximum intensity in the range of diffraction angle 2θ of 10° or more and 13° or less is represented by $I_B$ in said powder X-ray diffraction pattern.

<18> A lithium mixed metal oxide obtained by calcining a mixture of the coprecipitate according to <16> or <17> and a lithium compound by maintaining the mixture at a temperature of lower than 900° C.

<19> The lithium mixed metal oxide according to <18>, wherein the atmosphere in the calcination is an air atmosphere.

<20> The lithium mixed metal oxide according to <18> or <19>, wherein the retention temperature in the calcination is in the range of from 650° C. to 850° C.

<21> A positive electrode active material for nonaqueous electrolyte secondary battery, comprising the lithium mixed metal oxide according to any one of <1> to <5>, or <15>, or any one of <18> to <20> as a main ingredient.

<22> A positive electrode for nonaqueous electrolyte secondary battery having the positive electrode active material for nonaqueous electrolyte secondary battery according to <21>.

<23> A nonaqueous electrolyte secondary battery having the positive electrode for nonaqueous electrolyte secondary battery according to <22>.

<24> The nonaqueous electrolyte secondary battery according to <23>, further having a separator.

<25> The nonaqueous electrolyte secondary battery according to <24>, wherein the separator is a separator composed of a laminated film obtained by laminating a heat resistant porous layer and a porous film.

BRIEF DESCRIPTION OF THE DRAWINGS

FIG. 1 shows powder X-ray diffraction patterns of coprecipitates ($P_1$, $P_2$, $P_3$) in examples.

BEST MODES FOR CARRYING OUT THE INVENTION

Suitable embodiments of the present invention will be described in detail below, but the present invention is not limited to the following embodiments.

The lithium mixed metal oxide of the present invention contains Li as an essential component, contains Ni, Mn and Fe, and has a BET specific surface area of 2 m²/g or more and 30 m²/g or less. When the BET specific surface area is less than 2 m²/g or over 30 m²/g, the resultant nonaqueous electrolyte secondary battery manifests insufficient power output at high current rate. For further enhancing the effect of the present invention, the BET specific surface area of the lithium mixed metal oxide is preferably 3 m²/g or more and more preferably 5 m²/g or more. From the standpoint of a filling property, the BET specific surface area is preferably 15 m²/g or less and more preferably 10 m²/g or less.

For obtaining a nonaqueous electrolyte secondary battery having higher capacity, the lithium mixed metal oxide of the present invention is preferably shown by the following formula (A):

(A)

wherein, 0<x<1, 0<y<1, and 0<x+y<1.

In the lithium mixed metal oxide of the present invention, the ratio of the amount (mol) of Mn with respect to the total amount (mol) of Ni, Mn and Fe is preferably 0.1 or more and 0.7 or less and more preferably 0.2 or more and 0.5 or less, for obtaining a nonaqueous electrolyte secondary battery having higher capacity. The ratio of the amount (mol) of Mn with respect to the total amount (mol) of Ni, Mn and Fe represents the same meaning as for x in the formula (A). Namely, in the formula (A), the range of x is preferably 0.1≤x≤0.7 and more preferably 0.2≤x≤0.5. For enhancing the cyclic performance of the nonaqueous electrolyte secondary battery, it is preferable that the amount (mol) of Mn in the lithium mixed metal oxide be larger than the amount (mol) of Ni.

In the lithium mixed metal oxide of the present invention, the ratio of the amount (mol) of Fe with respect to the total amount (mol) of Ni, Mn and Fe is preferably 0.01 or more and 0.5 or less, for obtaining a nonaqueous electrolyte secondary battery having higher capacity. The ratio of the amount (mol) of Fe with respect to the total amount (mol) of Ni, Mn and Fe represents the same meaning as for y in the formula (A).

Namely, in the formula (A), the range of y is preferably 0.01≤y≤0.5.

Further, the present invention provides a method of producing a lithium mixed metal oxide, comprising bringing an aqueous solution containing Ni, Mn, Fe and Cl into contact with an alkali to obtain a coprecipitate, and calcining a mixture of the coprecipitate and a lithium compound by maintaining the mixture at a temperature of lower than 900° C. In the above-described contact, the coprecipitate is obtained in some cases in the form of powder, depending on the concentration of Ni, Mn and Fe in the aqueous solution and the state (aqueous solution or solid) of the alkali to be contacted with the aqueous solution, however, it is preferable that it be obtained in the form of coprecipitate slurry. Regarding the aqueous solution containing Ni, Mn, Fe and Cl, the alkali, the contact method of the aqueous solution and the alkali, the lithium compound, the method of mixing with the coprecipitate, the method of calcining the mixture, and the like, materials or methods described later can be adopted.

The method of producing a lithium mixed metal oxide of the present invention is preferably a production method containing the following steps (1), (2) and (3) in that order:

(1) a step of bringing an aqueous solution containing Ni, Mn, Fe and Cl into contact with an alkali to obtain a coprecipitate slurry, (2) a step of obtaining a coprecipitate from the coprecipitate slurry, (3) a step of calcining a mixture obtained by mixing the coprecipitate and a lithium compound by maintaining the mixture at a temperature of lower than 900° C., to obtain a lithium mixed metal oxide.

In the above-described step (1), the aqueous solution containing Ni, Mn, Fe and Cl is preferably an aqueous solution obtained by dissolving a chloride of Ni, a chloride of Mn, and a chloride of Fe into water by using respective chlorides as respective raw materials containing Ni, Mn and Fe. The chloride of Fe is preferably a chloride of divalent Fe. When respective raw materials containing Ni, Mn or Fe are poorly soluble in water, for example, when these raw materials are oxides, hydroxides or metal materials, these raw materials can be dissolved in an aqueous solution containing hydrochloric acid to obtain an aqueous solution containing Ni, Mn, Fe and Cl.

In the step (1), the alkali includes anhydrides of one or more compounds selected from the group consisting of LiOH (lithium hydroxide), NaOH (sodium hydroxide), KOH (potassium hydroxide), $Li_2CO_3$ (lithium carbonate), $Na_2CO_3$ (sodium carbonate), $K_2CO_3$ (potassium carbonate) and $(NH_4)_2CO_3$ (ammonium carbonate), and/or hydrates of the one or more compounds. In the step (1), an aqueous solution of the above-described alkali is preferably used. The alkali aqueous solution includes ammonia water. The concentration of an alkali in the alkali aqueous solution is usually about from 0.5 to 10 M, preferably about from 1 to 8 M. It is preferable from the standpoint of production cost to use an anhydride and/or a hydrate of NaOH or KOH, as the alkali to be used.

The contact method in the step (1) includes a method in which an alkali aqueous solution is added to an aqueous solution containing Ni, Mn, Fe and Cl and these are mixed, a method in which an aqueous solution containing Ni, Mn, Fe and Cl is added to an alkali aqueous solution and these are mixed, and a method in which an aqueous solution containing Ni, Mn, Fe and Cl and an alkali aqueous solution are added to water and these are mixed. It is preferable that these mixing procedures be accompanied by stirring. Among the above-described contact methods, the method in which an aqueous solution containing Ni, Mn, Fe and Cl is added to an alkali aqueous solution and these are mixed can be preferably used since pH is controlled easily in this method. In this case, with the progress of addition of an aqueous solution containing Ni, Mn, Fe and Cl to an alkali aqueous solution and mixing thereof, pH of the mixed liquid tends to become lower, and it is recommendable to add an aqueous solution containing Ni, Mn, Fe and Cl while adjusting pH to 9 or more, preferably 10 or more. Furthermore, it is preferable to perform contact of an aqueous solution containing Ni, Mn, Fe and Cl and an alkali aqueous solution while keeping either one or both of the aqueous solutions at a temperature of from 40° C. to 80° C., since a coprecipitate having a more uniform composition can be obtained.

In the step (1), a coprecipitate is generated and a coprecipitate slurry can be obtained as described above.

For obtaining a nonaqueous electrolyte secondary battery having enhanced capacity, it is preferable that the ratio of the amount (mol) of Mn with respect to the total amount (mol) of Ni, Mn and Fe be 0.1 or more and 0.7 or less in the aqueous solution containing Ni, Mn, Fe and Cl in the step (1).

Further, for obtaining a nonaqueous electrolyte secondary battery having enhanced capacity, it is preferable that the ratio of the amount (mol) of Fe with respect to the total amount (mol) of Ni, Mn and Fe be 0.01 or more and 0.5 or less in the aqueous solution containing Ni, Mn, Fe and Cl.

In the step (2), a coprecipitate is obtained from the above-described coprecipitate slurry. The step (2) may be carried out by any methods providing a coprecipitate can be obtained, and from the standpoint of operability, methods according to solid-liquid separation such as filtration are preferably used. A coprecipitate can be obtained also by methods of volatilizing liquid with heating such as spray drying, using a coprecipitate slurry.

In the case of obtaining a coprecipitate by solid-liquid separation in the step (2), the above-described step (2) is preferably the following step (2'): (2') A step of subjecting the coprecipitate slurry to solid-liquid separation, then, to washing and drying, to obtain a coprecipitate.

In the case of the presence of alkali and Cl in excess quantity in a solid component obtained after solid-liquid separation in the step (2'), these can be removed by washing with a washing solution. For washing a solid component efficiently, it is preferable to use water as the washing solution. If necessary, water-soluble organic solvents such as alcohols and acetones may be used as the washing solution. Washing may be carried out twice or more, and for example, it is possible that washing is carried out with water, then, washing is again carried out with the water-soluble organic solvent as described above.

In the step (2'), after washing, drying is performed to obtain a coprecipitate. Although drying is usually carried out by a thermal treatment, it may also be carried out by air blast drying, vacuum drying and the like. In the case of the thermal treatment, it is carried out usually at from 50° C. to 300° C., preferably at about from 100° C. to 200° C.

The BET specific surface area of a coprecipitate obtained in the step (2') is usually about $10 \text{ m}^2/\text{g}$ or more and $100 \text{ m}^2/\text{g}$ or less. The BET specific surface area of a coprecipitate can be controlled by drying temperature. The BET specific surface area of a coprecipitate is preferably $20 \text{ m}^2/\text{g}$ or more and more preferably $30 \text{ m}^2/\text{g}$ or more, for promoting the reactivity in the calcination described later. From the standpoint of operability, the BET specific surface area of a coprecipitate is preferably $90 \text{ m}^2/\text{g}$ or less and more preferably $85 \text{ m}^2/\text{g}$ or less. The coprecipitate is usually composed of a mixture of primary particles having a particle size of 0.001 μm or more and 0.1 μm or less and secondary particles having a particle size of 1 μm or more and 100 μm or less formed by aggregation of primary particles. The particle size of primary particles and secondary particles can be measured by observing by a scanning electron microscope (hereinafter, referred to as SEM in some cases). The particle size of secondary particles is preferably 1 μm or more and 50 μm or less and more preferably 1 μm or more and 30 μm or less.

The above-described coprecipitate, that is, a coprecipitate obtained by bringing an aqueous solution containing Ni, Mn, Fe and Cl into contact with an alkali preferably manifests a diffraction peak (diffraction peak A) in the range of diffraction angle 2θ of 17° or more and 20° or less, in a powder X-ray diffraction pattern obtained by powder X-ray diffractometry using CuKα as a radiation source and in which the measurement range of diffraction angle 2θ is 10° or more and 45° or less. A lithium mixed metal oxide obtained by calcining at a temperature of lower than 900° C. by using such a coprecipitate as a raw material of a lithium mixed metal oxide is useful for a positive electrode of a nonaqueous electrolyte secondary battery which is capable of manifesting higher power output at high current rate.

Further, it is preferable for the coprecipitate that when the maximum intensity in the range of diffraction angle 2θ of 10° or more and 13° or less be represented by $I_B$ in the above-described powder X-ray diffraction pattern, the value of peak intensity ratio $(I_B/I_A)$ obtained by dividing $I_B$ by the intensity $I_A$ of the diffraction peak A is 0 or more and 0.5 or less.

In the above-described powder X-ray diffraction pattern, the above-described diffraction peak A means a diffraction peak manifesting maximum intensity in the range of 2θ of 17° or more and 20° or less. The maximum intensity $I_B$ in the range of 2θ of 10° or more and 13° or less is the intensity of a diffraction peak manifesting maximum intensity when a diffraction peak is present in the above-described range, and is 0 when a diffraction peak is not present in the above-described range. Respecting the existence or nonexistence of a diffraction peak in the above-described powder X-ray diffraction pattern, it is regarded that there is no diffraction peak when the intensity ratio $I_x/I_0$ obtained by dividing $I_x$ by $I_0$ is less than 1.5, $I_0$ being the intensity of the background and $I_x$ being the intensity at arbitrary diffraction angle.

In the step (3), a mixture obtained by mixing the coprecipitate obtained as described above and a lithium compound is calcined to obtain a lithium mixed metal oxide. The lithium compound includes anhydrides of one or more compounds selected from the group consisting of lithium hydroxide, lithium chloride, lithium nitrate and lithium carbonate, and/or hydrates of the one or more compounds. Mixing may be carried out by either dry mode mixing or wet mode mixing, and from the standpoint of simplicity, dry mode mixing is preferable. The mixing apparatus includes a stirring mixer, a V-shaped mixer, a W-shaped mixer, a ribbon mixer, a drum mixer, a ball mill and the like.

The retention temperature in the above-described calcination is an important factor for controlling the BET specific surface area of a lithium mixed metal oxide. Usually, when the retention temperature is higher, the BET specific surface area tends to be lower. For example, in the step (3), the BET specific surface area of a lithium mixed metal oxide obtained in the case of calcination by maintaining at 900° C. is as small as 0.3 m$^2$/g, and thus, power output at high current rate is not sufficient. When the retention temperature is lower than this, the BET specific surface area tends to be larger. The retention temperature is preferably in the range of 650° C. or more and 850° C. or less. The time of keeping the above-described retention temperature is usually from 0.1 to 20 hours and preferably from 0.5 to 8 hours. The temperature rising rate up to the above-described retention temperature is usually from 50° C. to 400° C./hour, and the temperature dropping rate down to room temperature from the above-described retention temperature is usually from 10° C. to 400° C./hour. As the calcination atmosphere, air, oxygen, nitrogen, argon or mixed gas thereof can be used, and an air atmosphere is preferable.

In the above-described calcination, the mixture may contain a reaction accelerator. The reaction accelerator includes, more specifically, chlorides such as NaCl, KCl and NH$_4$Cl, fluorides such as LiF, NaF, KF and HN$_4$F, boric acid, preferably the above-described chlorides, more preferably KCl. By inclusion of a reaction accelerator in the mixture, the reactivity of the mixture in the calcination can be improved and the BET specific surface area of the resultant lithium mixed metal oxide can be controlled in some cases. Usually, when the retention temperature of the calcination is the same, if the content of a reaction accelerator in the mixture is larger, the BET specific surface area tends to be smaller. Further, two or more reaction accelerators can be used together. The reaction accelerator may be added and mixed, in mixing of a coprecipitate and a lithium compound. The reaction accelerator may remain in a lithium mixed metal oxide, or may be removed by washing, evaporation and the like.

After the above-described calcination, the resultant lithium mixed metal oxide may be pulverized using a ball mill, jet mill and the like. The BET specific surface area of the lithium mixed metal oxide can be controlled by pulverization in some cases. Pulverization and calcination may be repeated twice or more. The lithium mixed metal oxide can also be washed or classified, if necessary.

The lithium mixed metal oxide obtained by the above-described production method of the present invention is a lithium mixed metal oxide useful for a nonaqueous electrolyte secondary battery which is capable of manifesting high power output at high current rate.

The lithium mixed metal oxide of the present invention is constituted of primary particles having an average particle size of 0.05 μm or more and 1 μm or less. Usually, the lithium mixed metal oxide of the present invention is composed of a mixture of primary particles and secondary particles having an average particle size of 0.1 μm or more and 100 μm or less formed by aggregation of primary particles. The particle size of primary particles and secondary particles can be measured by observing by SEM. For further enhancing the effect of the present invention, the size of secondary particles is preferably 0.1 μm or more and 50 μm or less and more preferably 0.1 μm or more and 10 μm or less.

For further enhancing the effect of the present invention, the lithium mixed metal oxide of the present invention preferably has a crystalline structure of α-NaFeO$_2$-type, that is, a crystalline structure belonging to the R-3m space group. The crystalline structure can be identified from a powder X-ray diffraction pattern obtained by powder X-ray diffractometry using CuKα as a radiation source, for the lithium mixed metal oxide.

Regarding the composition of Li in a lithium mixed metal oxide of the present invention, the ratio of the amount (mol) of Li with respect to the total amount (mol) of Ni, Mn and Fe is usually 0.5 or more and 1.5 or less, and from the standpoint of further enhancing capacity maintenance ratio, it is preferably 0.95 or more and 1.5 or less and more preferably 1.0 or more and 1.4 or less. If the formula (A) is represented as the following formula (A'), z is usually 0.5 or more and 1.5 or less, preferably 0.95 or more and 1.5 or less and more preferably 1.0 or more and 1.4 or less.

$$\text{Li}_z(\text{Ni}_{1-x-y}\text{Mn}_x\text{Fe}_y)\text{O}_2 \quad\quad\quad (A')$$

wherein, $0<x<1$, $0<y<1$, $0<x+y<1$, and $0.5 \leq z \leq 1.5$.

In a range not impairing the effect of the present invention, a part of Li, Ni, Mn, Fe in a lithium mixed metal oxide of the present invention may be substituted by other elements. Here, the other elements include elements such as B, Al, Ga, In, Si, Ge, Sn, Mg, Sc, Y, Zr, Hf, Nb, Ta, Cr, Mo, W, Tc, Ru, Rh, Ir, Pd, Cu, Ag and Zn.

Onto the surface of particles constituting a lithium mixed metal oxide of the present invention, a compound different from the lithium mixed metal oxide may be adhered, in a range not impairing the effect of the present invention. Examples of the compound include compounds containing one or more elements selected from the group consisting of B, Al, Ga, In, Si, Ge, Sn, Mg and transition metal elements, preferably compounds containing one or more elements selected from the group consisting of B, Al, Mg, Ga, In and Sn and more preferably compounds of Al. Specific examples of the compound include oxides, hydroxides, oxyhydroxides, carbonates, nitrates and organic acid salts of the above-described elements. The oxides, the hydroxides and the oxyhydroxides are preferable. These compounds may be mixed. Among these compounds, alumina is a particularly preferable compound. Heating may be carried out after adhesion.

The positive electrode active material for nonaqueous electrolyte secondary battery composed of a lithium mixed metal oxide of the present invention is suitable for a nonaqueous electrolyte secondary battery. In the present invention, the positive electrode active material for nonaqueous electrolyte secondary battery may be composed of a lithium mixed metal oxide of the present invention as a main ingredient.

Using the positive electrode active material for nonaqueous electrolyte secondary battery, a positive electrode for nonaqueous electrolyte secondary battery can be produced, for example, as described below.

The positive electrode for nonaqueous electrolyte secondary battery is produced by allowing a positive electrode mixture containing a positive electrode active material, electrical conductive material and binder to be supported on a positive electrode current collector. As the above-described electrical conductive material, carbonaceous materials can be used, and the carbonaceous materials include a graphite powder, carbon black, acetylene black, filamentous carbon material and the like. Carbon black and acetylene black can be added in a small amount into a positive electrode mixture to enhance the electric conductivity in a positive electrode and to improve charge and discharge efficiency and rate property since carbon black and acetylene black are composed of fine particles and have large surface area, however, when added in too large an amount, an adhesion property by a binder between a positive electrode mixture and a positive electrode current collector is lowered, leading to a cause for increase in internal resistance. Usually, the proportion of an electrical conductive material in a positive electrode mixture is 5 parts by weight or more and 20 parts by weight or less with respect to 100 parts by weight of the positive electrode active material. In the case of use of a filamentous carbon material such as graphitized carbon fiber and carbon nanotube as the electrical conductive material, it is also possible to decrease this proportion.

As the above-described binder, thermoplastic resins can be used, and specifically mentioned are fluorine resins such as polyvinylidene fluoride (hereinafter, referred to as PVdF in some cases), polytetrafluoroethylene (hereinafter, referred to as PTFE in some cases), ethylene tetrafluoride propylene hexafluoride vinylidene fluoride copolymer, propylene hexafluoride vinylidene fluoride copolymer and ethylene tetrafluoride perfluoro vinyl ether copolymer, polyolefin resins such as polyethylene and polypropylene, etc. Two or more of these compounds may be used in admixture. Further, a positive electrode mixture excellent in adhesion property with a positive electrode current collector can be obtained by using a fluorine resin and a polyolefin resin as the binder, and containing them so that the proportion of the fluorine resin with respect to the positive electrode mixture is from 1 to 10% by weight and the proportion of the polyolefin resin with respect to the positive electrode mixture is from 0.1 to 2% by weight.

As the above-described positive electrode current collector, Al, Ni, stainless steel and the like can be used, and Al is preferable since it can be processed into a thin film easily and it is cheap. As the method for allowing a positive electrode mixture to be supported on a positive electrode current collector, there is mentioned a method of pressure molding or a method of pasting a positive electrode mixture using an organic solvent and the like, and applying this on a positive electrode current collector and drying this, then, performing pressing and the like to attain fixation thereof. In the case of pasting, a slurry composed of a positive electrode active material, electrical conductive material, binder and organic solvent is produced. The organic solvent includes amine solvents such as N,N-dimethylaminopropylamine and diethylenetriamine, ether solvents such as tetrahydrofuran, ketone solvents such as methyl ethyl ketone, ester solvents such as methyl acetate, amide solvents such as dimethylacetamide and N-methyl-2-pyrrolidone, etc.

Examples of the method of applying a positive electrode mixture on a positive electrode current collector include slit die coating method, screen coating method, curtain coating method, knife coating method, gravure coating method and electrostatic spray method. By the methods mentioned above, a positive electrode for nonaqueous electrolyte secondary battery can be produced.

Using the above-described positive electrode for nonaqueous electrolyte secondary battery, a nonaqueous electrolyte secondary battery can be produced as described below. That is, a separator, negative electrode and the above-described positive electrode are laminated and wound to obtain an electrode group, which is then accommodated in a battery can, then, an electrolytic solution composed of an organic solvent containing an electrolyte is impregnated, thus, a nonaqueous electrolyte secondary battery can be produced.

Examples of the shape of the above-described electrode group include shapes revealing circle, ellipse, rectangle and rounded rectangle of cross section when the electrode group is cut in a direction perpendicular to the axis of winding thereof. Examples of the shape of the battery include a paper shape, a coin shape, a cylinder shape and an angular shape.

The above-described negative electrode may be an electrode which can be doped or dedoped with a lithium ion at potential lower than a positive electrode, and mentioned are electrodes in which a negative electrode mixture containing a negative electrode material is supported on a negative electrode current collector, or electrodes composed solely of a negative electrode material. The negative electrode material includes carbonaceous materials, chalcogen compounds (oxides, sulfides and the like), nitrides, metals or alloys, which can be doped or dedoped with a lithium ion at potential lower than a positive electrode. These negative electrode materials may be mixed and used.

The above-described negative electrode materials will be exemplified below. Specifically mentioned as the above-described carbonaceous materials are graphites such as natural graphite and artificial graphite, cokes, carbon black, pyrolytic carbons, carbon fiber and organic polymer compound calcined bodies. Specifically mentioned as the above-described oxide are oxides of silicon represented by the formula $SiO_x$ (wherein, x represents a positive real number) such as $SiO_2$ and SiO, oxides of titanium represented by the formula $TiO_x$ (wherein, x represents a positive real number) such as $TiO_2$ and TiO, oxides of vanadium represented by the formula $VO_x$ (wherein, x represents a positive real number) such as $V_2O_5$ and $VO_2$, oxides of iron represented by the formula $FeO_x$ (wherein, x represents a positive real number) such as $Fe_3O_4$, $Fe_2O_3$ and FeO, oxides of tin represented by the formula $SnO_x$ (wherein, x represents a positive real number) such as $SnO_2$ and SnO, oxides of tungsten represented by the formula $WO_x$ (wherein, x represents a positive real number) such as $WO_3$ and $WO_2$, mixed metal oxides containing lithium and titanium and/or vanadium such as $Li_4Ti_5O_{12}$ and $LiVO_2$ (e.g., $Li_{1.1}V_{0.9}O_2$), etc. Specifically mentioned as the above-described sulfide are sulfides of titanium represented by the formula $TiS_x$ (wherein, x represents a positive real number) such as $Ti_2S_3$, $TiS_2$ and TiS, sulfides of vanadium represented by the formula $VS_x$ (wherein, x represents a positive real number) such as $V_3S_4$, $VS_2$ and VS, sulfides of iron represented by the formula $FeS_x$ (wherein, x represents a positive real number) such as $Fe_3S_4$, $FeS_2$ and FeS, sulfides of molybdenum represented by the formula $MoS_x$ (wherein, x represents a positive real number) such as $Mo_2S_3$ and $MoS_2$, sulfides of tin represented by the formula $SnS_x$ (wherein, x represents a positive real number) such as $SnS_2$ and SnS, sulfides of tungsten represented by the formula $WS_x$ (wherein, x represents a positive real number) such as $WS_2$, sulfides of antimony represented by the formula $SbS_x$ (wherein, x represents a positive real number) such as $Sb_2S_3$, sulfides of selenium represented by the formula $SeS_x$ (wherein, x represents a positive real number) such as $Se_5S_3$, $SeS_2$ and SeS, etc. Specifically mentioned as the above-described nitride are lithium-containing nitrides such as $Li_3N$ and $Li_{3-x}A_xN$ (wherein, A represents Ni and/or Co, and 0>x<3). These carbonaceous materials, oxides, sulfides and nitrides may be used together, and may be either crystalline or amorphous. Further, these carbonaceous materials, oxides, sulfides and nitrides are, in most cases, supported on a negative electrode current collector, and used as an electrode.

Specifically mentioned as the above-described metal are lithium metals, silicon metals and tin metals.

Specifically mentioned as the above-described alloy are lithium alloys such as Li—Al, Li—Ni and Li—Si, silicon alloys such as Si—Zn, tin alloys such as Sn—Mn, Sn—Co, Sn—Ni, Sn—Cu and Sn—La, and additionally, alloys such as $Cu_2Sb$ and $La_3Ni_2Sn_7$. These metals and alloys are, in most cases, used solely as an electrode (for example, used in the form of foil).

Among the above-described negative electrode materials, carbonaceous materials composed of graphite such as natural graphite and artificial graphite as a main ingredient are preferably used from the standpoint of high potential flatness, low average discharge potential, good cyclic performance and the like. As the shape of the carbonaceous material, for example, any of flake such as natural graphite, sphere such as mesocarbon microbeads, fiber such as graphitized carbon fiber, aggregate of fine powder and the like, may be used.

The above-described negative electrode mixture may contain a binder, if necessary. The binder includes thermoplastic resins, and specifically mentioned are PVdF, thermoplastic polyimide, carboxymethylcellulose, polyethylene, polypropylene and the like.

The above-described negative electrode current collector includes Cu, Ni, stainless steel and the like, and from the standpoint of difficulty of making an alloy with lithium and easiness of processing into a thin film, Cu may be advantageously used. As the method for allowing a negative electrode mixture to be supported on the negative electrode current collector, there are mentioned a method of pressure molding, a method of pasting a negative electrode mixture using a solvent and the like, and applying this on a negative electrode current collector and drying this, then, performing pressing to attain press bonding thereof, and so forth, like the case of a positive electrode.

As the above-described separator, for example, there can be used subject matters having a form of porous membrane, non-woven fabric, woven fabric or the like made of a material such as a polyolefin resin such as polyethylene and polypropylene, or a fluorine resin, nitrogen-containing aromatic polymer, and moreover, two or more of the above-described materials may be used to give a separator, or, the above-described subject matters may be laminated. As the separator, separators described in, for example, JP-A No. 2000-30686 and JP-A No. 10-324758 are mentioned. It is advantageous that the thickness of the separator is thinner providing that mechanical strength is maintained, from the standpoint of increase in the volumic energy density of a battery and decrease in internal resistance thereof, and it is usually about from 5 to 200 μm, preferably about from 5 to 40 μm.

The separator preferably has a porous film containing a thermoplastic resin. The nonaqueous electrolyte secondary battery preferably has a function by which, when an abnormal current flows in the battery usually because of short circuit between a positive electrode and a negative electrode and the like, the current is interrupted to block (shutdown) the flow of excessive current. Here, shutdown is carried out by obstructing micropores of a porous film of a separator, in the case of surpassing usual use temperature. It is preferable that after shutdown, even if the temperature in the battery increases to a certain high temperature, membrane destruction does not occur at this temperature and shutdown condition be maintained. As this separator, a laminated film obtained by laminating a heat resistant porous layer and a porous film is mentioned, and it becomes possible to further increase the heat resistance of a secondary battery in the present invention by using this film as a separator. Here, the heat resistant porous layer may be laminated on one surface of the porous film, or may be laminated on both surfaces thereof.

The above-described laminated film obtained by laminating a heat resistant porous layer and a porous film will be described below.

In the above-described laminated film, the heat resistant porous layer is a layer having higher heat resistance than the porous film, and the heat resistant porous layer may be formed from an inorganic powder, or may contain a heat resistant resin. Since the heat resistant porous layer contains a heat resistant resin, the heat resistant porous layer can be formed by an easy method such as coating. The heat resistant resin includes polyamide, polyimide, polyamideimide, polycarbonate, polyacetal, polysulfone, polyphenylene sulfide, polyether ketone, aromatic polyester, polyether sulfone and polyether imide, and from the standpoint of further enhancing heat resistance, preferable are polyamide, polyimide, polyamideimide, polyether sulfone and polyether imide, more preferable are polyamide, polyimide and polyamideimide. Further more preferable are nitrogen-containing aromatic polymers such as aromatic polyamide (para-oriented aromatic polyamide, meta-oriented aromatic polyamide), aromatic polyimide and aromatic polyamideimide, particularly preferable is aromatic polyamide, and from the standpoint of production, most preferable is para-oriented aromatic polyamide (hereinafter, referred to as "para-aramide" in some cases). The heat resistant resin includes also poly-4-methylpentene-1 and cyclic olefin polymers. By using these heat resistant resins, the heat resistance of a laminated film, that is, the thermal membrane destruction temperature of a laminated film can be further enhanced. In the case of use of a nitrogen-containing aromatic polymer among these heat resistant resins, compatibility with an electrolytic solution, namely, a liquid retaining property on a heat resistant porous layer also increases, possibly due to polarity in its molecule, and also the rate of impregnation of an electrolytic solution in production of a nonaqueous electrolyte secondary battery is high, and also the charge and discharge capacity of a nonaqueous electrolyte secondary battery increases further.

The thermal membrane destruction temperature of such a laminated film depends on the kind of a heat resistant resin, and is selected according to the use stage and use object. More specifically, the thermal membrane destruction temperature can be controlled to about 400° C. in the case of use of the above-described nitrogen-containing aromatic polymer, to about 250° C. in the case of use of poly-4-methylpentene-1 and to about 300° C. in the case of use of a cyclic olefin polymer, as the heat resistant resin, respectively. When the heat resistant porous layer is composed of an inorganic powder, it is also possible to control the thermal membrane destruction temperature to, for example, 500° C. or more.

The above-described para-aramide is obtained by condensation polymerization of a para-oriented aromatic diamine and a para-oriented aromatic dicarboxylic halide, and consists substantially of a repeating unit in which an amide bond is linked at a para-position or according orientation position of an aromatic ring (for example, orientation position extending coaxially or parallel toward the reverse direction, such as 4,4'-biphenylene, 1,5-naphthalene, and 2,6-naphthalene). Specifically exemplified are para-aramides having a para-orientation type structure or a structure according to the para-orientation type, such as poly(para-phenyleneterephthalamide), poly(para-benzamide), poly(4,4'-benzanilide terephthalamide), poly(para-phenylene -4,4'-biphenylene dicarboxylic amide), poly(para-phenylene-2,6-naphthalene dicarboxylic amide), poly(2-chloro-para-phenyleneterephthalamide) and para-phenyleneterephthalamide/2,6-dichloro para-phenyleneterephthalamide copolymer.

As the above-described aromatic polyimide, preferable are wholly aromatic polyimides produced by polycondensation of an aromatic dianhydride and a diamine. Specific examples of the dianhydride include pyromellitic dianhydride, 3,3',4,4'-diphenylsulfone tetracarboxylic dianhydride, 3,3',4,4'-benzophenone tetracarboxylic dianhydride, 2,2'-bis(3,4-dicarboxyphenyl)hexafluoropropane and 3,3',4,4'-biphenyl tetracarboxylic dianhydride. Specific examples of the diamine include oxydianiline, para-phenylenediamine, benzophenonediamine, 3,3'-methylenedianiline, 3,3'-diaminobenzophenone, 3,3'-diaminodiphenylsulfone and 1,5'-naphthalenediamine. Further, solvent-soluble polyimides can be suitably used. Examples of such a polyimide include a polyimide which is a polycondensate of 3,3',4,4'-diphenylsulfone tetracarboxylic dianhydride and an aromatic diamine.

The above-described aromatic polyamideimide includes those obtained by using an aromatic dicarboxylic acid and an aromatic diisocyanate and condensation-polymerizing them, and those obtained by using an aromatic dianhydride and an aromatic diisocyanate and condensation-polymerizing them. Specific examples of the aromatic dicarboxylic acid include isophthalic acid and terephthalic acid. Specific examples of the aromatic dianhydride include trimellitic anhydride. Specific examples of the aromatic diisocyanate include 4,4'-diphenylmethane diisocyanate, 2,4-tolylene diisocyanate, 2,6-tolylene diisocyanate, ortho-tolylane diisocyanate and m-xylene diisocyanate.

For further enhancing ion permeability, it is preferable that the thickness of the heat resistant porous layer be thinner providing that mechanical strength is not deteriorated, and the thickness is preferably 1 μm or more and 10 μm or less, further preferably 1 μm or more and 5 μm or less and particularly preferably 1 μm or more and 4 μm or less. The heat resistant porous layer has micropores, and the pore size (diameter) is usually 3 μm or less, preferably 1 μm or less. When the heat resistant porous layer contains a heat resistant resin, the heat resistant porous layer may further contain fillers described later.

In the above-described laminated film, it is preferable that the porous film have micropores, and has a shutdown function. In this case, the porous film contains a thermoplastic resin. The porous film has a micropore size of usually 3 μm or less, preferably 1 μm or less. The porous film has porosity of usually from 30 to 80% by volume, preferably from 40 to 70% by volume. In the nonaqueous electrolyte secondary battery, in the case of surpassing the usual use temperature, the porous film containing a thermoplastic resin is capable of obstructing micropores, by softening of the thermoplastic resin constituting the film.

As the above-described thermoplastic resin, those which are not dissolved in an electrolytic solution of a nonaqueous electrolyte secondary battery may be advantageously selected. Specifically mentioned are polyolefin resins such as polyethylene and polypropylene, and thermoplastic polyurethane resins, and a mixture of two or more of these compounds may also be used. For softening at lower temperature to attain shutdown, it is preferable that polyethylene be contained. As the polyethylene, specifically mentioned are polyethylenes such as low density polyethylene, high density polyethylene and linear polyethylene, and ultrahigh molecular weight polyethylenes having a molecular weight of 1000000 or more are also mentioned. For further enhancing the puncture strength of a porous film, it is preferable that the thermoplastic resin constituting the film contain at least an ultrahigh molecular weight polyethylene. From the standpoint of production of a porous film, it is preferable in some cases that the thermoplastic resin contain a wax composed of a polyolefin of low molecular weight (weight average molecular weight of 10000 or less).

The thickness of a porous film in a laminated film is usually from 3 to 30 μm, further preferably from 3 to 25 μm. In the present invention, the thickness of a laminated film is usually 40 μm or less, preferably 20 μm or less. It is preferable that the value of A/B be 0.1 or more and 1 or less, the thickness of a heat resistant porous layer being A (μm) and the thickness of a porous film being B (μm).

When a heat resistant porous layer contains a heat resistant resin, the heat resistant porous layer may also contain one or more fillers. The material of the filler may be selected from an organic powder, inorganic powder or a mixture thereof. It is preferable that particles constituting the filler have an average particle size of 0.01 μm or more and 1 μm or less.

The above-described organic powder includes powders made of organic substances such as styrene, vinyl ketone, acrylonitrile, methyl methacrylate, ethyl methacrylate, glycidyl methacrylate, glycidyl acrylate and methyl acrylate, singly or in the form of a copolymer composed of two or more of these compounds, and fluorine-containing resins such as polytetrafluoroethylene, ethylene tetrafluoride-propylene hexafluoride copolymer, ethylene tetrafluoride-ethylene copolymer and polyvinylidene fluoride; melamine resins; urea resins; polyolefins; polymethacrylate, and the like. These organic powders may be used singly, or in admixture of two or more. Among these organic powders, a polytetrafluoroethylene powder is preferable from the standpoint of chemical stability.

As the above-described inorganic powder, powders composed of inorganic substances such as, for example, metal oxides, metal nitrides, metal carbides, metal hydroxides, carbonates and sulfates are mentioned, and of them, powders composed of inorganic substances of low electric conductivity are preferably used. Specifically exemplified are powders composed of alumina, silica, titanium dioxide, calcium carbonate and the like. These inorganic powders may be used singly or in admixture of two or more. Among these inorganic powders, an alumina powder is preferable from the standpoint of chemical stability. Here, it is more preferable that all particles constituting the filler be alumina particles, and further more preferable is an embodiment in which all particles constituting the filler are alumina particles and a part of or all of them are approximately spherical alumina particles. When the heat resistant porous layer is formed from an inorganic powder, the above-exemplified inorganic powders may be advantageously used, and if necessary, a binder may be mixed with them.

The content of a filler when the heat resistant porous layer contains a heat resistant resin depends on the specific gravity of the material of the filler, and for example, when all particles constituting the filler are alumina particles, the weight of the filler is usually 5 or more and 95 or less, preferably 20 or more and 95 or less and more preferably 30 or more and 90 or less, the total weight of the heat resistant porous layer being 100. These ranges can be appropriately set, depending on the specific gravity of the material of the filler.

The shape of the filler includes an approximately spherical shape, a plate shape, a column shape, a needle shape, a whisker shape, a fiber shape and the like, and any particles can be used, and preferable are approximately spherical particles since uniform pores are formed easily with them. The approximately spherical particles include particles having a particle aspect ratio (particle major axis/particle minor axis) of 1 or more and 1.5 or less. The particle aspect ratio can be measured by an electron micrograph.

In the present invention, the separator has an air permeability according to the Gurley method of preferably from 50 to 300 sec/100 cc, further preferably from 50 to 200 sec/100 cc, from the standpoint of combination with ion permeability. The separator has a porosity of usually from 30 to 80% by volume, preferably from 40 to 70% by volume. The separator may also be a laminate of separators having different porosities.

In a secondary battery, the electrolytic solution is usually composed of an organic solvent containing an electrolyte. The electrolyte includes lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (wherein, BOB means bis(oxalato)borate), lower aliphatic carboxylic acid lithium salts and $LiAlCl_4$, and a mixture of two or more of these compounds may also be used. Usually, at least one compound selected from the group consisting of $LiPF_6$, $LiAsF_6$, $LiSbF_6$, $LiBF_4$, $LiCF_3SO_3$, $LiN(SO_2CF_3)_2$ and $LiC(SO_2CF_3)_3$ containing fluorine, among the above-mentioned salts, is used as the lithium salt.

In the above-described electrolytic solution, use can be made as the organic solvent of, for example, carbonates such as propylene carbonate, ethylene carbonate, dimethyl carbonate, diethyl carbonate, ethyl methyl carbonate, 4-trifluoromethyl-1,3-dioxolan-2-one and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran and 2-methyltetrahydrofuran; esters such as methyl formate, methyl acetate and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide and 1,3-propane sultone, or compounds obtained by further introducing a fluorine substituent into the above-described organic solvents, and usually, two or more of these solvents are used in admixture. Of them, preferable are mixed solvents containing carbonates, and further preferable are mixed solvents of cyclic carbonates and non-cyclic carbonates or mixed solvents of cyclic carbonates and ethers. As the mixed solvents of cyclic carbonates and non-cyclic carbonates, preferable are mixed solvents containing ethylene carbonate, dimethyl carbonate and ethyl methyl carbonate since the operational temperature range is wide, a load property is excellent, and difficult degradability is secured even if a graphite material such as natural graphite and artificial graphite is used as the negative electrode active material. Lithium salts containing fluorine such as $LiPF_6$ and organic solvents having a fluorine substituent are preferably used since a particularly excellent safety improving effect is obtained. Mixed solvents containing dimethyl carbonate and ethers having a fluorine substituent such as pentafluoropropyl methyl ether and 2,2,3,3-tetrafluoropropyl difluoromethyl ether are further preferable since these are excellent also in a large current discharge property.

Instead of the above-described electrolytic solution, a solid electrolyte may be used. As the solid electrolyte, for example, organic polymer electrolytes such as polyethylene oxide type polymer compounds and polymer compounds containing a polyorganosiloxane chain and/or polyoxyalkylene chain can be used. Further, so-called gel type electrolytes obtained by allowing a non-aqueous electrolyte solution to be supported on a polymer compound can also be used. Moreover, inorganic solid electrolytes containing a sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$ and $Li_2S$—$SiS_2$—$Li_2SO_4$ may also be used. Using these solid electrolytes, safety can be further enhanced. In the nonaqueous electrolyte secondary battery of the present invention, when a solid electrolyte is used, the solid electrolyte plays a role of separator in some cases. In these cases, a separator is not necessary in some cases.

Examples of the present invention will be described below, but the examples shown below are suitable examples for explaining the present invention and do not limit the present invention at all.

Evaluation and charge and discharge test of lithium mixed metal oxides (positive electrode active material) were carried out as described below.

1. Charge and Discharge Test

To a mixture of a positive electrode active material and an electrical conductive material (mixture of acetylene black and graphite of 1:9) was added an N-methyl-2-pyrrolidone (hereinafter, referred to as NMP in some cases) solution of PVdF as a binder so as to give a composition of active material: electrical conductive material: binder=86:10:4 (ratio by weight) and the resultant mixture was kneaded to obtain a paste, and the paste was applied on an Al foil having a thickness of 40 μm as a current collector, and vacuum drying at 150° C. was performed for 8 hours to obtain a positive electrode.

The resultant positive electrode was combined with a solution (hereinafter, described as $LiPF_6$/EC+DMC+EMC in some cases) prepared by dissolving $LiPF_6$ in a concentration of 1 mol/l liter into a mixed solution of ethylene carbonate (hereinafter, referred to as EC in some cases), dimethyl carbonate (hereinafter, referred to as DMC in some cases) and ethyl methyl carbonate (hereinafter, referred to as EMC in some cases) of a ratio of 30:35:35 (ratio by volume) as an electrolytic solution, a polypropylene porous membrane as a separator, and metal lithium as a negative electrode, thereby fabricating a coin-shaped battery (R2032).

Using the above-described coin-shaped battery, a discharge rate test was carried out under conditions shown below while maintaining at 25° C. In the discharge rate test, the discharge capacity was measured while changing the discharge current in discharging, and the discharge capacity maintenance ratio was calculated according to the formula described below.

<Discharge Rate Test>

The charge maximum voltage was adjusted to 4.3 V, the charge time was adjusted to 8 hours, the charge current was adjusted to 0.264 mA/cm², and in discharging, the discharge minimum voltage was adjusted to a constant level of 3.0 V, and under such conditions, discharge was carried out while changing the discharge current in each cycle as described below. Higher discharge capacity by discharge at 10C (high current rate) means higher power output.

Discharge at 1-st and 2-nd cycles (0.2C): discharge current 0.264 mA/cm²

Discharge at 3-rd cycle (1C): discharge current 1.32 mA/cm²

Discharge at 4-th cycle (3C): discharge current 3.96 mA/cm²

Discharge at 5-th cycle (5C): discharge current 6.60 mA/cm²

Discharge at 6-th cycle (10C): discharge current 13.2 mA/cm²

<Discharge Capacity Maintenance Ratio>

Discharge capacity maintenance ratio (%)=discharge capacity at cycle of given turn/initial discharge capacity×100

2. Measurement of BET Specific Surface Area of Lithium Mixed Metal Oxide

One gram of a powder was dried in a nitrogen atmosphere at 150° C. for 15 minutes, then, the BET specific surface area was measured using FlowSorb II 2300 manufactured by Micrometrics.

3. Analysis of Composition of Lithium Mixed Metal Oxide

A powder was dissolved in hydrochloric acid, then, measurement thereof was performed using Inductively Coupled Plasma-Atomic Emission Spectrometry (SPS 3000, manufactured by Seiko Instruments Inc., hereinafter, referred to as ICP-AES in some cases).

4. SEM Observation of Lithium Mixed Metal Oxide

Particles constituting a lithium mixed metal oxide were placed on an electrical conductive sheet pasted onto a sample stage, and irradiated with an electron beam having an acceleration voltage of 20 kV using JSM-5510 manufactured by JEOL Ltd., and under such conditions, SEM observation was carried out. The average particle size was measured by selecting fifty particles arbitrarily from an image (SEM photograph) obtained by SEM observation, measuring the particle sizes of them, and calculating an average value thereof.

5. Powder X-Ray Diffractometry of Lithium Mixed Metal Oxide

Powder X-ray diffractometry of a lithium mixed metal oxide was carried out using RINT 2500 TTR-type manufactured by Rigaku Corporation. A lithium mixed metal oxide was filled on a dedicated substrate, and the measurement was carried out in the range of diffraction angle $2\theta=10°$ to $90°$ using a CuK$\alpha$ radiation source, to obtain a powder X-ray diffraction pattern.

COMPARATIVE EXAMPLE 1

1. Production of Lithium Mixed Metal Oxide

Lithium carbonate ($Li_2CO_3$: manufactured by The Honjo Chemical Corporation)(39.16 g), nickel hydroxide ($Ni(OH)_2$: manufactured by Kansai Catalyst Co. Ltd.) (38.23 g), manganese oxide ($MnO_2$: manufactured by Kojundo Chemical Laboratory Co. Ltd.)(44.43 g), tri-cobalt tetra-oxide ($Co_3O_4$: manufactured by Seido Chemical Industry Co., Ltd.) (7.80 g) and boric acid ($H_3BO_3$: manufactured by YCHEM Co., Ltd.) (1.85 g) were weighed respectively, and mixed using a ball mill mixer under conditions shown below, to obtain a raw material mixed powder.

Pulverization media: 15 mm$\phi$ alumina balls (5.8 kg)
Revolution of ball mill: 80 rpm
Volume of ball mill: 5 L The above-described raw material mixed powder was charged in an alumina sheath, and calcined by keeping in an air atmosphere at 1040° C. for 4 hours, to obtain a block object. This block object was pulverized using a jet mill apparatus (AFG-100, manufactured by Hosokawa Micron Corporation), to obtain a powder $A_1$.

As a result of analysis of the ICP composition of the powder $A_1$, the molar ratio of Li:Ni:Mn:Co was 1.04:0.41:0.49: 0.10. The powder $A_1$ had a BET specific surface area of 2.6 $m^2$/g, and as a result of powder X-ray diffractometry, the crystal structure thereof was ascribable to the R-3m space group.

2. Discharge Rate Test of Nonaqueous Electrolyte Secondary Battery

A coin-shaped battery was manufactured using the powder $A_1$, and a discharge rate test was carried out to find that the discharge capacities (mAh/g) at 0.2C, 1C, 3C, 5C and 10C were 140, 120, 97, 82 and 58, respectively, and the capacity maintenance ratios (%) thereof were 100, 86, 69, 59 and 41, respectively.

EXAMPLE 1

1. Production of Lithium Mixed Metal Oxide

In a polypropylene beaker, 83.88 g of potassium hydroxide was added to 200 ml of distilled water and dissolved by stirring, leading to complete dissolution of potassium hydroxide, thereby preparing a potassium hydroxide aqueous solution (alkali aqueous solution). In a glass beaker, to 200 ml of distilled water was added 13.90 g of nickel(II) chloride hexahydrate, 13.95 g of manganese(II) chloride tetrahydrate and 4.05 g of iron(III) chloride hexahydrate, and these were dissolved by stirring, to obtain a nickel-manganese-iron mixed aqueous solution. While stirring the above-described potassium hydroxide aqueous solution, the above-described nickel-manganese-iron mixed aqueous solution was dropped into this, to cause generation of a coprecipitate, thereby obtaining a coprecipitate slurry. pH at the end of the reaction was measured to find a value of 13.

Subsequently, the coprecipitate slurry was subjected to filtration and washing with distilled water, and dried at 100° C. to obtain a coprecipitate $P_1$. In SEM observation of the coprecipitate $P_1$, the average value of the particle sizes of primary particles thereof was 0.03 $\mu$m, and the BET specific surface area was 83 $m^2$/g. As a result of analysis of the $P_1$ composition, the molar ratio of Ni:Mn:Fe was 0.41:0.49: 0.10, and as a result of powder X-ray diffractometry of $P_1$, a peak A was detected in the range of $2\theta$ of from 19.0° to 19.5°, a peak was detected around 11° in the range of $2\theta$ of 10° or more and 13° or less, and $I_B/I_A$ was 0.46, in the powder X-ray diffraction pattern. The powder X-ray diffraction pattern is shown in FIG. 1.

The above-described coprecipitate ($P_1$) (2.0 g) and lithium hydroxide monohydrate (1.16 g) were dry-mixed using an agate mortar to obtain a mixture. Then, the mixture was placed in an alumina calcination vessel, calcination thereof was performed by maintaining at 800° C. in an air atmosphere for 6 hours using an electric furnace, and the mixture was cooled down to room temperature to obtain a calcined article, and this was pulverized, washed with distilled water by decantation, and filtrated and dried at 100° C. for 8 hours, to obtain a powder $B_1$.

As a result of analysis of the composition of the powder $B_1$, the molar ratio of Li:Ni:Mn:Fe was 1.34:0.41:0.49:0.10. The powder $B_1$ had a BET specific surface area of 6.4 $m^2$/g, and in SEM observation of the powder $B_1$, the average value of the particle sizes of primary particles was 0.2 $\mu$m. As a result of powder X-ray diffractometry, it was found that the crystal structure of the powder $B_1$ was a crystal structure belonging to the R-3m space group.

2. Discharge Rate Test of Nonaqueous Electrolyte Secondary Battery

A coin-shaped battery was fabricated using the powder $B_1$, and a discharge rate test was carried out to find that the discharge capacities (mAh/g) at 0.2C, 1C, 3C, 5C and 10C were 113, 102, 90, 83 and 69, respectively, and the capacity maintenance ratios (%) thereof were 100, 90, 80, 73 and 61, respectively, indicating that the discharge capacity and the capacity maintenance ratio at 10C were higher than the discharge capacity and the capacity maintenance ratio of $A_1$, respectively.

EXAMPLE 2

1. Production of Lithium Mixed Metal Oxide

The same procedure as in Example 1 was carried out to obtain a coprecipitate slurry, excepting that the amount of nickel(II) chloride hexahydrate was 16.04 g, the amount of manganese(II) chloride tetrahydrate was 13.36 g and the amount of iron(III) chloride hexahydrate was 4.05 g. pH at the end of the reaction was measured to find a value of 13.

Subsequently, the coprecipitate slurry was subjected to filtration and washing with distilled water, and dried at 100° C. to obtain a coprecipitate $P_2$. In SEM observation of the coprecipitate $P_2$, the average value of the particle sizes of primary particles thereof was 0.05 $\mu$m, and the BET specific surface area was 63 m²/g. As a result of analysis of the $P_2$ composition, the molar ratio of Ni:Mn:Fe was 0.45:0.45: 0.10, and as a result of powder X-ray diffractometry of $P_2$, a peak A was detected in the range of 2θ of from 19.0° to 19.5°, a peak was detected around 11° in the range of 2θ of 10° or more and 13° or less, and $I_B/I_A$ was 0.31, in the powder X-ray diffraction pattern. The powder X-ray diffraction pattern is shown in FIG. 1.

The above-described coprecipitate ($P_2$) (2.0 g) and lithium hydroxide monohydrate (1.16 g) were dry-mixed using an agate mortar to obtain a mixture. Then, the mixture was placed in an alumina calcination vessel, calcination thereof was performed by maintaining at 800° C. in an air atmosphere for 6 hours using an electric furnace, and the mixture was cooled down to room temperature to obtain a calcined article, and this was pulverized, washed with distilled water by decantation, and filtrated and dried at 100° C. for 8 hours, to obtain a powder $B_2$.

As a result of analysis of the composition of the powder $B_2$, the molar ratio of Li:Ni:Mn:Fe was 1.35:0.45:0.45:0.10. The powder $B_2$ had a BET specific surface area of 7.1 m²/g, and in SEM observation of the powder $B_2$, the average value of the particle sizes of primary particles was 0.3 μm. As a result of powder X-ray diffractometry, it was found that the crystal structure of the powder $B_2$ was a crystal structure belonging to the R-3m space group.

2. Discharge Rate Test of Nonaqueous Electrolyte Secondary Battery

A coin-shaped battery was fabricated using the powder $B_2$, and a discharge rate test was carried out to find that the discharge capacities (mAh/g) at 0.2C, 1C, 3C, 5C and 10C were 108, 96, 83, 77 and 61, respectively, and the capacity maintenance ratios thereof were 100, 89, 77, 71 and 56, respectively, indicating that the discharge capacity and the capacity maintenance ratio at 10C were higher than the discharge capacity and the capacity maintenance ratio of $A_1$, respectively.

EXAMPLE 3

1. Production of Lithium Mixed Metal Oxide

The same procedure as in Example 1 was carried out to obtain a powder $B_3$ excepting that the mixture in Example 1 was calcined by maintaining at 700° C. The powder $B_3$ had a BET specific surface area of 9 m²/g. As a result of analysis of the composition of the powder $B_3$, the molar ratio of Li:Ni:Mn:Fe was 1.34:0.41:0.49:0.10. In SEM observation of the powder $B_3$, the average value of the particle sizes of primary particles was 0.2 μm. As a result of powder X-ray diffractometry, it was found that the crystal structure of the powder $B_3$ was a crystal structure belonging to the R-3m space group.

2. Discharge Rate Test of Nonaqueous Electrolyte Secondary Battery

A coin-shaped battery was fabricated using the powder $B_3$, and a discharge rate test was carried out to find that the discharge capacities (mAh/g) at 0.2C, 1C, 3C, 5C and 10C were 118, 105, 94, 83 and 72, respectively, and the capacity maintenance ratios (%) thereof were 100, 89, 80, 70 and 61, respectively, indicating that the discharge capacity and the capacity maintenance ratio at 10C were higher than the discharge capacity and the capacity maintenance ratio of $A_1$, respectively.

EXAMPLE 4

1. Production of Lithium Mixed Metal Oxide

The same procedure as in Example 1 was carried out to obtain a powder $B_4$ excepting that the mixture in Example 1 was calcined by maintaining at 600° C. The powder $B_4$ had a BET specific surface area of 17 m²/g. As a result of analysis of the composition of the powder $B_4$, the molar ratio of Li:Ni:Mn:Fe was 1.35:0.41:0.49:0.10. In SEM observation of the powder $B_4$, the average value of the particle sizes of primary particles was 0.1 μm. As a result of powder X-ray diffractometry, it was found that the crystal structure of the powder $B_4$ was a crystal structure belonging to the R-3m space group.

2. Discharge Rate Test of Nonaqueous Electrolyte Secondary Battery

A coin-shaped battery was fabricated using the powder $B_4$, and a discharge rate test was carried out to find that the discharge capacities (mAh/g) at 0.2C, 1C, 3C, 5C and 10C were 101, 89, 78, 70 and 58, respectively, and the capacity maintenance ratios (%) thereof were 100, 88, 77, 69 and 57, respectively, indicating that the discharge capacity and the capacity maintenance ratio at 10C were higher than the discharge capacity and the capacity maintenance ratio of $A_1$, respectively.

REFERENCE EXAMPLE 1

The same procedure as in Example 1 was carried out to obtain a powder $A_2$ excepting that the mixture in Example 1 was calcined by maintaining at 900° C. The powder $A_2$ had a BET specific surface area of 0.3 m²/g. As a result of analysis of the composition of the powder $A_2$, the molar ratio of Li:Ni:Mn:Fe was 1.30:0.41:0.49:0.10. In SEM observation of the powder $A_2$, the average value of the particle sizes of primary particles was 0.7 μm. As a result of powder X-ray diffractometry, it was found that the crystal structure of the powder $A_2$ was a crystal structure belonging to the R-3m space group.

2. Discharge Rate Test of Nonaqueous Electrolyte Secondary Battery

A coin-shaped battery was fabricated using the powder $A_2$, and a discharge rate test was carried out to find that the discharge capacity and the capacity maintenance ratio at 10C, that is, power output at high current rate was not sufficient. Specifically, the discharge capacities (mAh/g) at 0.2C, 1C, 3C, 5C and 10C were 76, 51, 45, 22 and 14, respectively, and the capacity maintenance ratios (%) thereof were 100, 67, 59, 29 and 18, respectively, indicating insufficient results.

EXAMPLE 5

1. Production of Lithium Mixed Metal Oxide

The same procedure as in Example 2 was carried out to obtain a coprecipitate slurry, excepting that 2.982 g of iron(II) chloride tetrahydrate as a di-valent Fe chloride was used instead of iron(III) chloride hexahydrate, and a nickel-manganese-iron mixed aqueous solution was dropped while constantly maintaining the potassium hydroxide aqueous solution at 60° C. pH at the end of the reaction was measured to find a value of 14.

Subsequently, the above-described coprecipitate slurry was subjected to filtration and washing with distilled water, and dried at 100° C. to obtain a coprecipitate $P_3$. In SEM observation of the coprecipitate $P_3$, the average value of the particle sizes of primary particles thereof was 0.02 μm, and the BET specific surface area was 96 m²/g. As a result of analysis of the $P_3$ composition, the molar ratio of Ni:Mn:Fe was 0.45:0.45:0.10, and as a result of powder X-ray diffractometry of $P_3$, a peak A was detected in the range of 2θ of from 19.0° to 19.5°, a peak was not detected in the range of 2θ of from 10° to 13°, and $I_B/I_A$ was 0, in the powder X-ray diffraction pattern. The powder X-ray diffraction pattern is shown in FIG. 1.

The above-described coprecipitate ($P_3$) (2.0 g) and lithium hydroxide monohydrate (1.16 g) were dry-mixed using an agate mortar to obtain a mixture. Then, the mixture was placed in an alumina calcination vessel, calcination thereof was performed by maintaining at 800° C. in an air atmosphere for 6 hours using an electric furnace, and the mixture was cooled down to room temperature to obtain a calcined article, and this was pulverized, washed with distilled water by decantation, and filtrated and dried at 100° C. for 8 hours, to obtain a powder $B_5$.

As a result of analysis of the composition of the powder $B_5$, the molar ratio of Li:Ni:Mn:Fe was 1.20:0.45:0.45:0.10. The powder $B_5$ had a BET specific surface area of 6.8 $m^2$/g, and in SEM observation of the powder $B_5$, the average value of the particle sizes of primary particles was 0.2 μm. As a result of powder X-ray diffractometry, it was found that the crystal structure of the powder $B_5$ was a crystal structure belonging to the R-3m space group.

2. Discharge Rate Test of Nonaqueous Electrolyte Secondary Battery

A coin-shaped battery was fabricated using the powder $B_5$, and a discharge rate test was carried out to find that the discharge capacities (mAh/g) at 0.2C, 1C, 3C, 5C and 10C were 122, 108, 95, 87 and 75, respectively, and the capacity maintenance ratios (%) thereof were 100, 89, 78, 71 and 61, respectively, indicating that the discharge capacity and the capacity maintenance ratio at 10C were higher than the discharge capacity and the capacity maintenance ratio of $A_1$, respectively.

EXAMPLE 6

1. Production of Lithium Mixed Metal Oxide

The same procedure as in Example 5 was carried out to obtain a powder $B_6$, excepting that 2.0 g of the coprecipitate $P_3$, 1.16 g of lithium hydroxide monohydrate and 1.16 g of KCl (reaction accelerator) were dry-mixed using an agate mortar.

As a result of analysis of the composition of the powder $B_6$, the molar ratio of Li:Ni:Mn:Fe was 1.10:0.45:0.45:0.10. The powder $B_6$ had a BET specific surface area of 7.6 $m^2$/g, and in SEM observation of the powder $B_6$, the average value of the particle sizes of primary particles was 0.1 μm. As a result of powder X-ray diffractometry, it was found that the crystal structure of the powder $B_6$ was a crystal structure belonging to the R-3m space group.

2. Discharge Rate Test of Nonaqueous Electrolyte Secondary Battery

A coin-shaped battery was fabricated using the powder $B_6$, and a discharge rate test was carried out to find that the discharge capacities (mAh/g) at 0.2C, 1C, 3C, 5C and 10C were 143, 129, 116, 108 and 88, respectively, and the capacity maintenance ratios (%) thereof were 100, 90, 81, 76 and 62, respectively, indicating that the discharge capacity and the capacity maintenance ratio at 10C were higher than the discharge capacity and the capacity maintenance ratio of $A_1$, respectively.

PRODUCTION EXAMPLE 1

Production of Laminated Film
(1) Production of Coating Solution

Calcium chloride (272.7 g) was dissolved in NMP (4200 g), then, para-phenylenediamine (132.9 g) was added and dissolved completely. To the resultant solution was added gradually 243.3 g of terephthalic dichloride and polymerization thereof was carried out to obtain a para-aramide, and this was diluted further with NMP, to obtain a para-aramide solution (A) having a concentration of 2.0% by weight. To 100 g of the resultant para-aramide solution was added 2 g of an alumina powder (a) (manufactured by Nippon Aerosil Co., Ltd., Alumina C, average particle size 0.02 μm) and 2 g of an alumina powder (b) (Sumicorandom AA03 manufactured by Sumitomo Chemical Co., Ltd., AA03, average particle diameter 0.3 μm) as a filler in a total amount of 4 g, and these were mixed and treated three times by a nanomizer, and further, filtrated through a 1000 mesh wire netting, and de-foamed under reduced pressure to produce a slurry-formed coating solution (B). The weight of the alumina powders (filler) with respect to the total weight of the para-aramide and the alumina powders was 67% by weight.

(2) Production of Laminated Film and Evaluation Thereof.

A polyethylene porous membrane (thickness 12 μm, air permeability 140 sec/100 cc, average pore size 0.1 μm, porosity 50%) was used as the porous film. On a PET film having a thickness of 100 μm, the above-described polyethylene porous membrane was fixed, and the slurry-form coating solution (B) was coated on the porous membrane by a bar coater manufactured by Tester Sangyo Co., Ltd. The product was immersed in water as a poor solvent while maintaining integration of the porous membrane coated on the PET film, to cause deposition of a para-aramide porous membrane (heat resistant porous layer), then, the solvent was dried to obtain a laminated film 1 composed of a heat resistant porous layer and a porous film laminated. The thickness of the laminated film 1 was 16 μm, and the thickness of the para-aramide porous membrane (heat resistant porous layer) was 4 μm. The laminated film 1 had an air permeability of 180 sec/100 cc, and a porosity of 50%. The cross section of the heat resistant porous layer in the laminated film 1 was observed by a scanning electron microscope (SEM) to find that relatively small micropores of about 0.03 μm to 0.06 μm and relatively large micropores of about 0.1 μm to 1 μm were present. Evaluation of the laminated film was carried out by the following method.

<Evaluation of Laminated Film>

(A) Measurement of Thickness The thickness of the laminated film and the thickness of the porous film were measured according to JIS standard (K7130-1992). As the thickness of the heat resistant porous layer, a value obtained by subtracting the thickness of the porous film from the thickness of the laminated film was used.

(B) Measurement of Air Permeability by Gurley Method

The air permeability of the laminated film was measured by digital timer mode Gurley type Densometer manufactured by Yasuda Seiki Seisakusho Ltd., according to JIS P8117.

(C) Porosity

A sample of the resultant laminated film was cut into a square having a side length of 10 cm, and the weight W (g) and the thickness D (cm) thereof were measured. The weights (Wi (g)) of the layers in the sample were measured, and the volumes of the respective layers were calculated from Wi and the true specific gravities (true specific gravity i (g/$cm^3$)) of the materials of the respective layers, and the porosity (% by volume) was calculated according to the following formula.

Porosity (% by volume)=$100 \times \{1-(W1/\text{true specific gravity 1}+W2/\text{true specific gravity 2}+ \ldots +Wn/\text{true specific gravity } n)/(10 \times 10 \times D)\}$ In the above-described examples, a lithium secondary battery which is capable of having further enhanced thermal membrane destruction temperature can be obtained if the laminated film obtained in Production Example 1 is used as the separator.

Industrial Applicability

According to the present invention, it is possible to obtain a lithium mixed metal oxide which is capable of providing a nonaqueous electrolyte secondary battery showing higher power output at higher current rate, as compared with conventional lithium secondary batteries, and to obtain a secondary battery using the oxide. This secondary battery is extremely useful, particularly, in applications requiring high power output at high current rate, that is, in nonaqueous electrolyte secondary batteries for automobiles and power tools such as electrical tools.

The invention claimed is:

1. A lithium mixed metal oxide comprising Ni, Mn and Fe and having a BET specific surface area of 6.4 m²/g or more and 30 m²/g or less,
    wherein the ratio of the amount (mol) of Fe with respect to the total amount (mol) of Ni, Mn and Fe is 0.01 or more and 0.1 or less.

2. The lithium mixed metal oxide according to claim 1, wherein the lithium mixed metal oxide is shown by the following formula (A):

$$Li(Ni_{1-x-y}Mn_xFe_y)O_2 \quad (A)$$

wherein, $0<x<1$, $0.01 \leq y \leq 0.1$, and $0<x+y<1$.

3. The lithium mixed metal oxide according to claim 1, wherein the lithium mixed metal oxide is shown by the following formula (A'):

$$Li_z(Ni_{1-x-y}Mn_xFe_y)O_2 \quad (A')$$

wherein, $0<x<1$, $0.01 \leq y \leq 0.01$, $0<x+y<1$, and $0.5 \leq z \leq 1.5$.

4. The lithium mixed metal oxide according to claim 1, wherein the ratio of the amount (mol) of Mn with respect to the total amount (mol) of Ni, Mn and Fe is 0.1 or more and 0.7 or less.

5. A positive electrode active material for nonaqueous electrolyte secondary battery, comprising the lithium mixed metal oxide according to claim 1 as a main ingredient.

6. A positive electrode for nonaqueous electrolyte secondary battery having the positive electrode active material for nonaqueous electrolyte secondary battery according to claim 5.

7. A nonaqueous electrolyte secondary battery having the positive electrode for nonaqueous electrolyte secondary battery according to claim 6.

8. The nonaqueous electrolyte secondary battery according to claim 7, further having a separator.

9. The nonaqueous electrolyte secondary battery according to claim 8, wherein the separator is a separator composed of a laminated film obtained by laminating a heat resistant porous layer and a porous film.

* * * * *